United States Patent [19]

Samuelson et al.

[11] Patent Number: 4,482,189
[45] Date of Patent: Nov. 13, 1984

[54] CAST VEHICLE WHEEL

[75] Inventors: Michael A. Samuelson; James H. Dick, both of Melbourne, Australia

[73] Assignee: General Motors-Holden's Limited, Victoria, Australia

[21] Appl. No.: 341,985
[22] PCT Filed: May 26, 1981
[86] PCT No.: PCT/AU81/00064
§ 371 Date: Jan. 12, 1982
§ 102(e) Date: Jan. 12, 1982
[87] PCT Pub. No.: WO81/03465
PCT Pub. Date: Dec. 10, 1981

[30] Foreign Application Priority Data

May 26, 1980 [AU] Australia ............... PE3731

[51] Int. Cl.³ ............................................. B60B 3/02
[52] U.S. Cl. ................................... 301/6 CS; 301/65
[58] Field of Search ............ 301/6 CS, 63 PW, 63 D, 301/65

[56] References Cited

U.S. PATENT DOCUMENTS 1,346,863  7/1920  Walther ......................... 301/65
1,387,529  8/1921  Williams ........................ 301/65
4,165,131  8/1979  Thompson ....................... 301/65

FOREIGN PATENT DOCUMENTS 2442785  4/1975  Fed. Rep. of Germany ........ 301/65
1365089  5/1964  France ......................... 301/65
579294   7/1958  Italy .......................... 301/65

Primary Examiner—David A. Scherbel
Attorney, Agent, or Firm—Stevens, Davis, Miller & Mosher

[57] ABSTRACT

A cast vehicle wheel composed of relatively light section throughout and having an imperforate annular disc between the hub (2) and rim (3). A tire bead seating surface (8) at one side of the rim (3) is formed by a substantially cylindrical wall section (10) which is integral with the adjacent tire retaining wall (6) and extends inwardly across and adjacent cylindrical surface of the rim (3). The bead seating wall (10) is spaced radially outwards from that rim surface and a plurality of circumferentially spaced webs (17) are provided in that space (14) between the rim (3) and the bead seating wall (10). The exposed end (18) of each web (17) slopes to facilitate movement of a tire bead onto the seating wall (10).

3 Claims, 2 Drawing Figures

CAST VEHICLE WHEEL

This invention relates to vehicle wheels and a method of making such wheels.

It is conventional practice to cast vehicle wheels from a metal alloy, but problems arise if the casting is of heavy sections or includes heavy sections. Heavy casting sections are subject to porosity and shrinkage problems so that failure from cracking for example is more likely to occur. In addition, uneven weight distribution is likely to occur. In addition, uneven weight distribution is likely to occur because of inconsistencies throughout the casting that presents balancing difficulties when the wheel is ultimately put to use.

The normal method of alleviating the aforementioned problems is to cast a wheel with holes through the region between the hub and rim of the wheel. That is not a complete answer to the problem and in any event introduces another disadvantage in that, in use, air is pushed outwardly through those holes. It would be more beneficial to prevent such outward escape of air so as to maximize air circulation at the inside of the wheel and thereby promote cooling of the wheel brake assembly.

It is an object of the present invention to provide a cast vehicle wheel which is composed of relatively light section throughout without requiring through holes as discussed above.

According to the present invention there is provided a cast vehicle wheel including, a hub member, an annular disc section surrounding and formed integral with said hub member, a generally cylindrical rim member formed integral with said disc section and located radially outwardly of said hub member, a tire retaining wall or flange at each end of said rim member, and a substantially cylindrical tire bead seating wall formed integral with one of said tire retaining flanges and extending towards but terminating short of the other said tire retaining flange, said bead seating wall being spaced radially outward from the adjacent surface of said rim member.

The essential features of the invention, and further optional features, are described in detail in the following passages of the specification which refer to the accompanying drawings. The drawings however, are merely illustrative of how the invention might be put into effect, so that the specific form and arrangement of the features (whether they be essential or optional features) shown is not to be understood as limiting on the invention.

Figure 2:
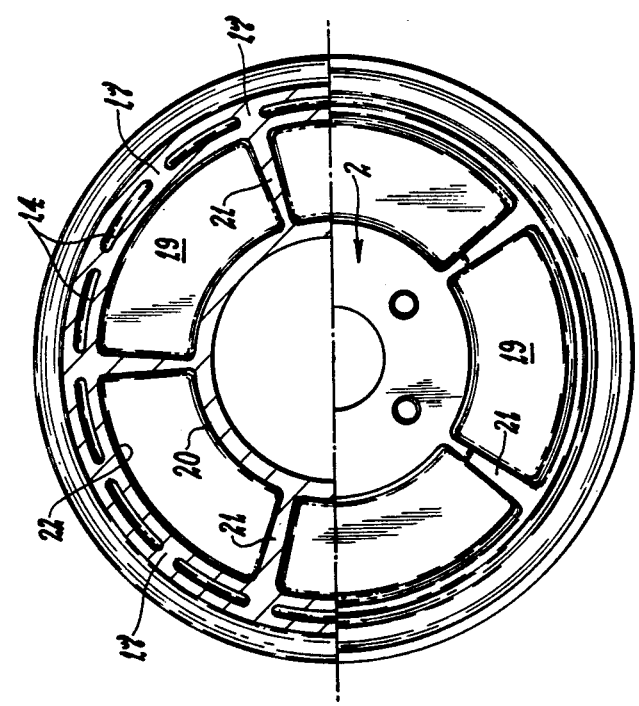
FIG. 2 is a partially sectioned elevation, a section being taken along line II—II of FIG. 1.
Figure 1:
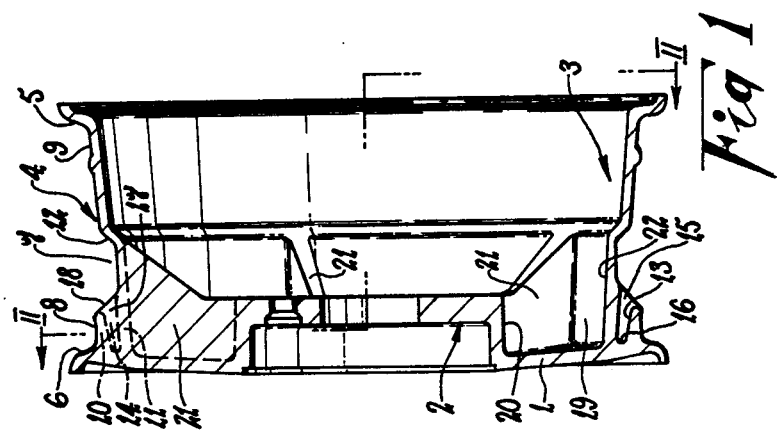
FIG. 1 is a cross sectional view of a wheel according to one embodiment of the invention.

A characteristic of a wheel according to the invention is that it has an imperforate disc 1 between the hub member 2 and rim member 3. That is, the disc does not need to have relatively large through holes as required in prior constructions for the purpose of reducing the cast section. The disc 1 can be of relatively light section throughout and although holes as previously described are not essential, there may be circumstances under which some form of perforation of the disc 1 is required.

The rim member 2 is composed of a generally cylindrical section 4 which extends axially outwards from the front side of the disc 1 and has relatively shallow tire retaining flanges 5 and 6 at its front and rear ends respectively. The outer surface cofiguration of the rim section 4 is such as to meet user requirements and that normally involves provision of a circumferential well or groove 7 at a location closer to the rear end of the section 4. A raised circumferential area 8 and 9 is provided on each side of the groove 7 to provide tire bead seating surfaces.

In accordance with the present invention the section of the casting forming the base of the groove 7 continues through to the rear side of the wheel and the tire bead seating surface 8 on that side is defined by a generally cylindrical wall section 10 which overlies and is spaced radially outwards from a rear portion 11 of the rim section 4. As a result, both the rim section 4 and the overlying bead seating section 10 can be formed as relatively thin sections. The bead seating surface 9 on the front side of the rim 3 can be also formed of relatively thin section by merely stepping the casting radially outwards an appropriate distance at a location 12 on the front side of the groove 7. A relatively thin section can also be employed for both the disc 1 and the hub 2 which, as shown, is generally stepped axially forward of the disc 1.

The undersurface 13 of the wall section 10 may slope radially inwards towards the rear of the wheel so as to facilitate the casting process. In any event, it is preferred that the recess 14 defined below that wall section 10 has a greater depth at its front open end 15 than at its rear closed end 16. The rear end 16 is closed by a continuation of the wheel disc 1 or of the rear tire retaining wall 6.

As shown, it is preferred to provide a plurality of webs 17 within the recess 14 so as to guard against a tyre bead catching in the mouth 15 of that recess during location of a tyre on the wheel. It is also preferred that the exposed end 18 of each web 17 slopes outwardly and downwardly towards the front of the wheel to provide a ramping surface which facilitates movement of a tire bead from the well 7 on to the rear bead seating surface 8. The webs 17 may also serve to provide a support for the overlying wall section 10. Such webs 17 can be cast in situ and may be of relatively light section so as not to disturb the basic aim of the invention.

As previously stated, the hub 2 is preferably stepped axially forward of the surrounding disc 1 and consequently an annular cavity 19 is defined around an outer surface 20 of the hub 2. If desired, a plurality of webs 21 may be provided, as shown, within the cavity 19 so that each extends radially between the hub 2 and the inner cylindrical surface 22 of the rim section 4. The webs 21 can be shaped and arranged to suit styling requirements and serve to divide the cavity 19 into a plurality of pockets. Once again, the webs 21 may be of relatively thin section.

It will be appreciated from the foregoing description that the present invention provides an improvement over prior cast wheel structures in that it enables the use of relatively light section without requiring the provision of large vent holes.

Finally, it is to be understood that various alterations, modifications and/or additions may be introduced into the constructions and arrangements of parts previously described without departing from the spirit or ambit of the invention as defined by the appended claims.

We claim:

1. A cast vehicle wheel including, a hub member, an imperforate annular disc section surrounding and formed integral with said hub member, a generally cylindrical rim member formed integral with said disc section and located radially outwardly of said hub member, said rim member being stepped between its axial ends to form a well section of reduced diameter, a tire retaining flange at each axial end of said rim member, one said retaining flange surrounding and being contiguous with said disc section, a substantially cylindrical tire bead seating wall formed integral with said one retaining flange and extending therefrom towards the other said retaining flange, said bead seating wall overlying and being spaced radially outwards of a surface of the rim member which is contiguous with the base of said well section, a terminal edge of said bead seating wall being located adjacent said well section, a plurality of circumferentially spaced webs provided in the space between said bead seating wall and the surface which it overlies, and an end edge of each said web being contiguous with said terminal edge of the bead seating wall and sloping downwardly and away from that terminal edge.

2. A cast vehicle wheel according to claim 1, wherein said disc section interconnects adjacent ends of said hub and rim members and an annular cavity is defined between said members, a plurality of circumferentially spaced webs are provided within said cavity and each is joined to both the hub member and the rim member.

3. A cast vehicle wheel according to claim 1, formed as a single piece casting.

* * * * *